United States Patent
Itoh et al.

(10) Patent No.: US 6,550,130 B2
(45) Date of Patent: Apr. 22, 2003

(54) MANUFACTURING PROCESS FOR A DIVIDED STATOR

(75) Inventors: Kazuo Itoh, Kasai (JP); Toshiyuki Tachibana, Himeji (JP)

(73) Assignee: Itoh Electric Co., Ltd., Kasai (JP)

( * ) Notice: Subject to any disclaimer, the term of this patent is extended or adjusted under 35 U.S.C. 154(b) by 0 days.

(21) Appl. No.: 09/761,668

(22) Filed: Jan. 18, 2001

(65) Prior Publication Data

US 2001/0005932 A1 Jul. 5, 2001

Related U.S. Application Data

(62) Division of application No. 09/246,137, filed on Feb. 8, 1999, now Pat. No. 6,225,725.

(51) Int. Cl.[7] .............................................. H02K 15/02
(52) U.S. Cl. ............................ 29/596; 310/216; 29/606
(58) Field of Search ......................... 29/596, 598, 606, 29/607, 609, 732; 310/254, 154, 156, 112, 214, 216, 42

(56) References Cited

U.S. PATENT DOCUMENTS

| | | | |
|---|---|---|---|
| 1,957,380 A | 5/1934 | Barlow | |
| 2,506,629 A | 5/1950 | Bilde et al. | |
| 3,353,046 A | * 11/1967 | Papst | .......................... 310/214 |
| 3,869,629 A | 3/1975 | Ogawa et al. | |
| 4,015,154 A | 3/1977 | Tanaka et al. | |
| 4,812,695 A | 3/1989 | Parshall | |
| 4,912,353 A | 3/1990 | Kondo et al. | |
| 5,095,610 A | * 3/1992 | Schultz et al. | ................. 29/596 |
| 5,191,698 A | * 3/1993 | Sumi et al. | .................... 29/596 |
| 5,498,917 A | 3/1996 | Ninomiya et al. | |
| 5,502,341 A | 3/1996 | Sato | |
| 5,570,503 A | 11/1996 | Stokes | |
| 5,592,731 A | * 1/1997 | Huang et al. | .................. 29/596 |
| 5,722,152 A | 3/1998 | Sumi et al. | |
| 5,949,171 A | * 9/1999 | Horski et al. | ................ 310/216 |
| 6,226,856 B1 | * 5/2001 | Kazama et al. | ................ 29/596 |

FOREIGN PATENT DOCUMENTS

| | | |
|---|---|---|
| DE | 3907516 A1 | 9/1990 |
| EP | 849857 A1 | 6/1998 |
| JP | 2-44848 (U) A | 3/1990 |
| JP | 4-58746 A | 2/1992 |
| JP | 5-292708 A | 11/1993 |

* cited by examiner

*Primary Examiner*—David P. Bryant
*Assistant Examiner*—Stephen Kenny
(74) *Attorney, Agent, or Firm*—Smith Patent Office

(57) ABSTRACT

In manufacturing the iron core of a divided stator, a plurality of pole pieces with fitting portions formed on both sides of pole portions are laminated and fixed to one another. A plurality of the pole piece laminates are arranged in the form of a ring and the outer or inner circumference is held with a jig. A non-magnetic and high-rigidity connecting member is press-fit in the laminating direction into fitting portions of a plurality of adjacent pole piece laminates, thereby a plurality of adjacent pole piece laminates are positioned with high accuracy and rigidly connected to one another.

13 Claims, 9 Drawing Sheets

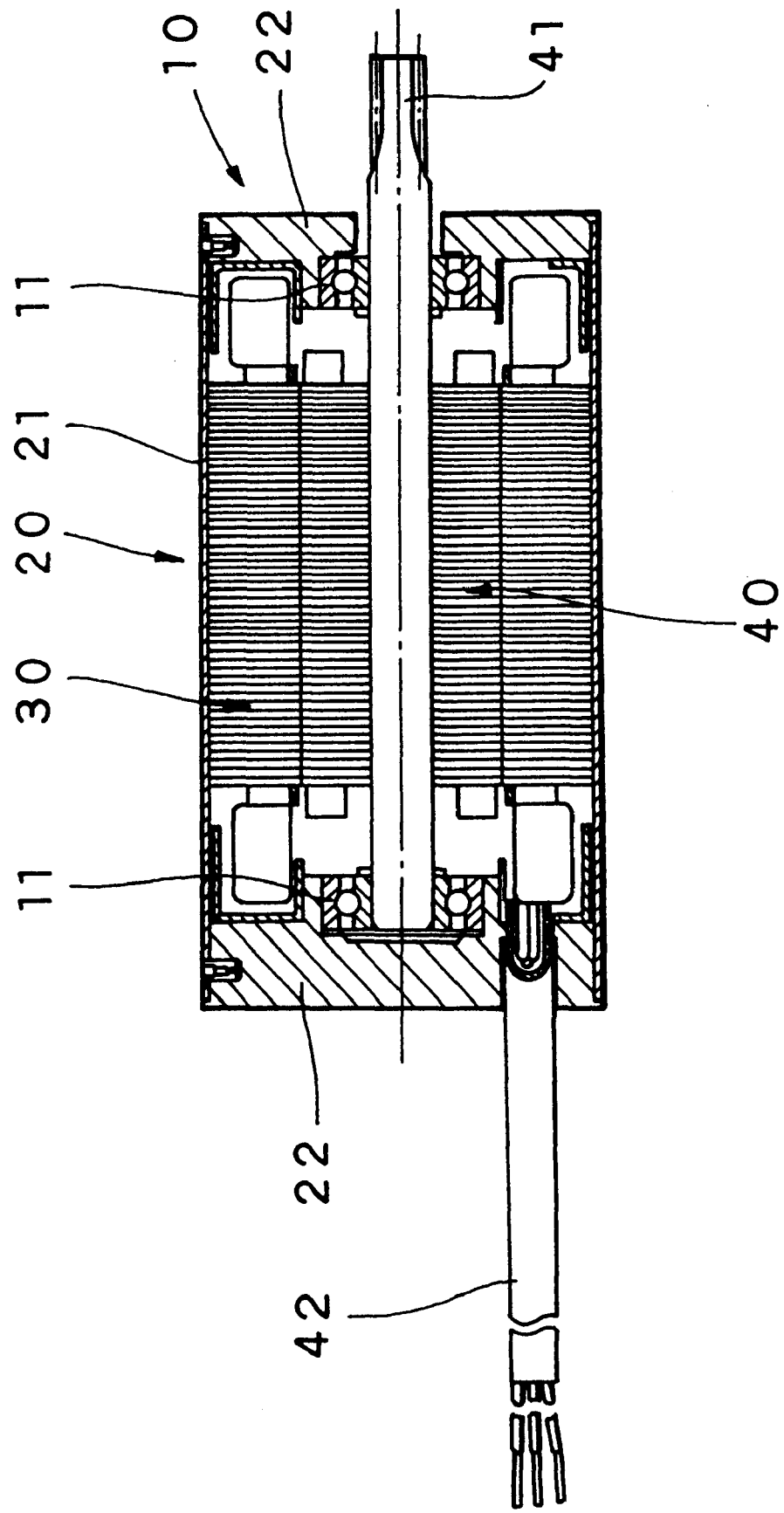

MANUFACTURING PROCESS FOR A DIVIDED STATOR

This application is a divisional application of U.S. application Ser. No. 09/246,137 now U.S. Pat. No. 6,225,725 filed on Feb. 8, 1999.

BACKGROUND OF THE INVENTION

1. Field of the Invention

The present invention relates to a divided stator and a manufacturing process for a divided stator used in a rotating electric apparatus, and more specifically, to a manufacturing process that can rigidly connect pole pieces by a simple operation while maintaining accurate positioning of the pole pieces.

2. Discussion of the Related Art

In a rotating electric apparatus, in order to simplify coil winding of the stator, a divided stator has been proposed in which a plurality of pole piece laminates are arranged in a ring, and the inside pole portions of pole piece laminates are connected with synthetic resin, etc. to form an iron core. After winding coil between slots of the iron core, the iron core is fitted into a cylindrical outer ring yoke (see Japanese Utility Model Application Laid-open No. Hei 2-44848 (1990) and Japanese Patent Application Laid-open No. Hei 4-58746 (1992)).

On the other hand, in order to position pole pieces accurately with respect to each other and to ensure durability and reliability of the stator, the applicant of the present invention has proposed a process for manufacturing an iron core by integrally forming an iron core blank in which a plurality of pole pieces are arranged in the form of a ring. A bridge portion is formed between adjoining ends of the inner circumferential tip of each pole piece protruding from the inner circumferential end inwards or between adjoining ends of the outer circumferential tip protruding from the outer circumferential end outwards. This is followed by laminating a plurality of iron core blanks and fixing them to each other, fitting them into forming dies to connect them with a synthetic resin material, and then cutting the bridge portion protruding either inwards or outwards (see Japanese Patent Application No. Hei 4-117035).

However, in the above-mentioned manufacturing process, since a plurality of iron core blanks are stacked and inserted in forming dies and portions of the pole pieces are connected with a synthetic resin material, a complicated process for inserting iron core blanks and injecting synthetic resin material are required. Since the pole pieces are connected by covering them with synthetic resin, the connection strength between adjoining pole pieces is low, and the pole piece connecting operation and bridge portion cutting operation must be carried out separately, which complicates the process.

SUMMARY OF THE INVENTION

In view of the foregoing, it is an object of the invention to provide a manufacturing process for a divided stator which can be rigidly connected by a simple operation while accurately positioning the pole pieces.

The manufacturing process for a divided stator according to the invention comprises forming an iron core having outer circumferential slots by arranging a plurality of pole pieces having inner pole portions in a ring and connecting the inner pole portions of a plurality of adjoining pole pieces to one another;

winding coil around the outer circumferential slots of the iron core, and inserting the iron core into an outer ring yoke provided with a cylindrical inner surface;

wherein the iron core is manufactured by laminating a plurality of pole pieces having a fit portion formed on both sides, fixing the plurality of pole pieces to each other to form pole piece laminates, arranging a plurality of the pole piece laminates in a ring, holding the outer circumference or inner circumference thereof by jigs, and press-fitting connecting members in a laminating direction between adjacent portions of the plurality of adjoining pole piece laminates.

The connecting member is preferably made of a rigid material which is not deformed by press-fitting between adjoining pieces. More preferably, it may be made from a synthetic resin material or metallic material. The connecting member and the fit portion of the pole pieces are arranged such that they can be fitted to each other. For example, a protrusion may be formed in the connecting member and the fit portion may be recessed. Alternatively, a recess can be formed in the connecting member and the adjoining pole pieces contain a protrusion. If a jig is used, the jig preferably has a circular shape on the inner surface or the outer surface, and a recess may be formed in the inner surface of the jig to allow the pole piece outer tip portion to be fitted in order to improve positioning accuracy.

One of the characteristics of the invention is the step of holding the outer circumference or the inner circumference of a ring form pole piece laminate with a jig and then press-fitting a rigid connecting member between adjoining pole pieces at the fit portions. The fit portions are generally near the inner pole portion of the pole piece in the laminating direction. With this configuration, the pole piece laminates are accurately positioned and at the same time rigidly connected. However, it is sometimes troublesome to laminate disconnected pole pieces and to accurately arrange the pole pieces in the form of a ring. Therefore, connecting the pole pieces in the form of a ring in advance facilitates accurate lamination and ring formation. It is desirable that the connected pole pieces can be cut while maintaining the capabilities of the original stator itself. In the present invention, since the rigid connecting member is press-fitted, it is possible to break the connected form and separate the pole pieces from one another using the press-fit force. However, because the pole pieces are connected to one another in advance, the pole pieces are unable to be separated from one another at their position. Therefore, the pole pieces are advanced outwards in the radial direction by a specified distance and separated from one another by press-fitting the connecting member.

That is, the manufacturing process for a divided stator according to another embodiment of the invention comprises forming an iron core having outer circumferential slots by arranging a plurality of pole pieces having inner pole portions in a ring and connecting the inner pole portions of a plurality of adjoining pole pieces to one another;

winding coil around the outer circumferential slots of the iron core, and inserting the iron core into an outer ring yoke provided with a cylindrical inner surface;

wherein the iron core is manufactured by integrally forming an iron core blank comprising a plurality of pole pieces, arranging the pole pieces in a ring, wherein fit portions are formed on both sides of the pole pieces;

forming a bridge portion between the plurality of pole pieces adjacent to each other wherein the bridge portion can be broken by circumferential separation;

laminating and fixing a plurality of iron core blanks to form an iron core laminate, holding an outer circumference of the iron core laminate with a jig in such a manner that each pole piece advances outwards in a radial direction by a specified distance, breaking the bridge portion by separating the pole pieces in a circumferential direction while advancing each pole piece outwards in a radial direction by press-fitting a connecting member between fit portions of a plurality of adjacent pole pieces thereby connecting the adjacent pole pieces.

In order to break the bridge portion by press-fitting the connecting member, it is important that the width of the connecting member be greater than the distance between adjacent fit portions before press-fitting. It is also desirable to construct the jig in such a manner that the outer tip of the pole piece can advance outwards in the radial direction by a specified distance. For example, the inside diameter of the jig may be set slightly greater than the outside diameter of the iron core blank or the inside diameter of the jig may be set equal to or slightly smaller than the outside diameter of the iron core blank, and a fitting recess may be formed on the inner circumferential edge of the jig so that the outer tip of the pole piece can advance by a specified distance.

All the pole pieces are connected at a bridge portion and are used for the iron core blank. However, when all the pole pieces are connected in advance, the bridge portion of the laminated pole piece may be unbreakable unless the press-fitting force of the connecting member is increased. Therefore, tightly positioning (i.e. grasping) the laminated pole pieces between the iron core blank facilitates lamination and ring arrangement and at the same time enables easier breakage of the bridge portion without excessively increasing the fit-in pressure of the connecting member.

That is, the manufacturing process for a divided stator according to another embodiment of the invention comprises forming an iron core having outer circumferential slots by arranging a plurality of pole pieces having inner pole portions in a ring and connecting the inner pole portions of a plurality of adjoining pole pieces to one another;

winding coil around the outer circumferential slots of the iron core, and inserting the iron core into an outer ring yoke provided with a cylindrical inner surface;

wherein the iron core is manufactured by integrally forming an iron core blank comprising a plurality of pole pieces, arranging the pole pieces in a ring, wherein fit portions are formed on both sides of the pole pieces;

forming a bridge portion between the plurality of pole pieces adjacent to each other, wherein the bridge portion can be broken by circumferential separation;

laminating a plurality of pole piece laminates in a ring and positioning them between the pole pieces of at least two iron core blanks and fixing the pole pieces to each other, holding an outer circumference or an inner circumference of at least two iron core blanks and a plurality of the pole piece laminates with a jig in such a manner that each pole piece and pole piece laminate can advance outwards in a radial direction by a specified distance, breaking the bridge portion by press-fitting a connecting member between fit portions of the plurality of pole pieces and pole piece laminates adjacent to each other thereby advancing each pole piece and pole piece laminate outwards in the radial direction and separating adjacent pole pieces in the circumferential direction, and at the same time connecting the adjacent pole pieces and pole piece laminates.

For the iron core profile blank, at least two pieces are required for grasping pole piece laminates in between, and optionally three or more pieces may be inserted between pole piece laminates. It is preferable for the bridge portion to have a thin wall between the adjacent pole pieces in order to break the bridge portion accurately. This thin-wall portion should have a reduced width or reduced thickness at the bridge portion center, both side portions, or other portions. For example, the wall thickness of the section on both ends of the bridge portion can be made thin if the bridge portion is semi-punched when punching the iron core. This semi-punching may be carried out during crimping. It is also possible to form a bridge by punching a section with a minimum or reduced width or reduced thickness from the space between adjacent pole portions at the time of punching the iron core.

A divided stator generally comprises an iron core and an outer ring yoke into which the iron core is inserted. Therefore, the outer ring yoke may be used as a jig for holding the outer circumference of the iron core blank laminate or the outer circumference of the iron core blank laminate together with the pole piece laminate.

That is, a yoke blank may be integrally formed with a fit-in recess on the inner circumferential edge that allows the outer tip portion of the pole piece laminate or the outer tip portion of the iron core blank and the pole piece laminate to be separated by a specified distance and fitted. A plurality of yoke blanks are laminated and fixed to one another to serve as an outer ring yoke, and the ring yoke can be used in place of the jig. Thus, the manufacture of the iron core and the insertion of the iron core into the cylindrical yoke can be carried out simultaneously. However, in this case, it is important to install the stator windings around the slot before fitting in the connecting member.

Since the pole piece connecting member is small, when the laminated pole piece is grasped between iron core blanks, there is less influence on the stator functions without breaking the pole piece connecting member. Therefore, it is possible to adopt a method which does not even require the step of forcibly breaking the bridge portion.

That is, the manufacturing method for a divided type stator according to another embodiment of the invention comprises forming an iron core having outer circumferential slots by arranging a plurality of pole pieces having inner pole portions in a ring and connecting the inner pole portions of a plurality of adjoining pole pieces to one another;

winding coil around the outer circumferential slots of the iron core, and inserting the iron core into an outer ring yoke provided with a cylindrical inner surface;

wherein the iron core is manufactured by integrally forming an iron core blank comprising a plurality of pole pieces, arranging the pole pieces in a ring, wherein fit portions are formed on both sides of the pole pieces;

forming a bridge portion between the plurality of pole pieces adjacent to each other, laminating a plurality of pole pieces having a fit portion on both sides to form pole piece laminates;

arranging a plurality of pole piece laminates in a ring, positioning the pole piece laminates between the pole pieces of at least two iron core blanks and fixing;

press-fitting a connecting member between fit portions of a plurality of pole pieces and pole piece laminates adjacent to each other, thereby connecting the plurality of adjacent pole pieces and pole piece laminates.

According to the invention, since the ring shaped outer circumference is a plurality of pole piece laminates, laminates of iron core blanks or laminates of a pole piece and an iron core blank are held with a jig, and a non-magnetic, rigid connecting member is press fit between adjacent fit portions of the pole pieces so that the pole pieces are accurately positioned when the connecting member is press-fit.

In addition, because a plurality of adjacent pole piece laminates and/or pole pieces are connected to one another by connecting members, they are formed as an integral structure as a whole, and a high connection strength is obtained. Thus, a reliable stator with a stable structure can be manufactured.

Laminating iron core blanks or grasping pole piece laminates between iron core blanks can achieve pole piece lamination easily and with high accuracy. In addition, because press-fitting of connecting members is utilized to break the bridge portion of the iron core profile blanks, connection and breakage can be carried out simultaneously. As a result, the manufacturing process can be simplified as compared to the conventional manufacturing process that requires two separate steps.

BRIEF DESCRIPTION OF THE DRAWINGS

FIG. 9 is a cross-sectional view showing a rotating electric apparatus manufactured by the present process;

DETAILED DESCRIPTION OF THE PREFERRED EMBODIMENTS

Figure 1:
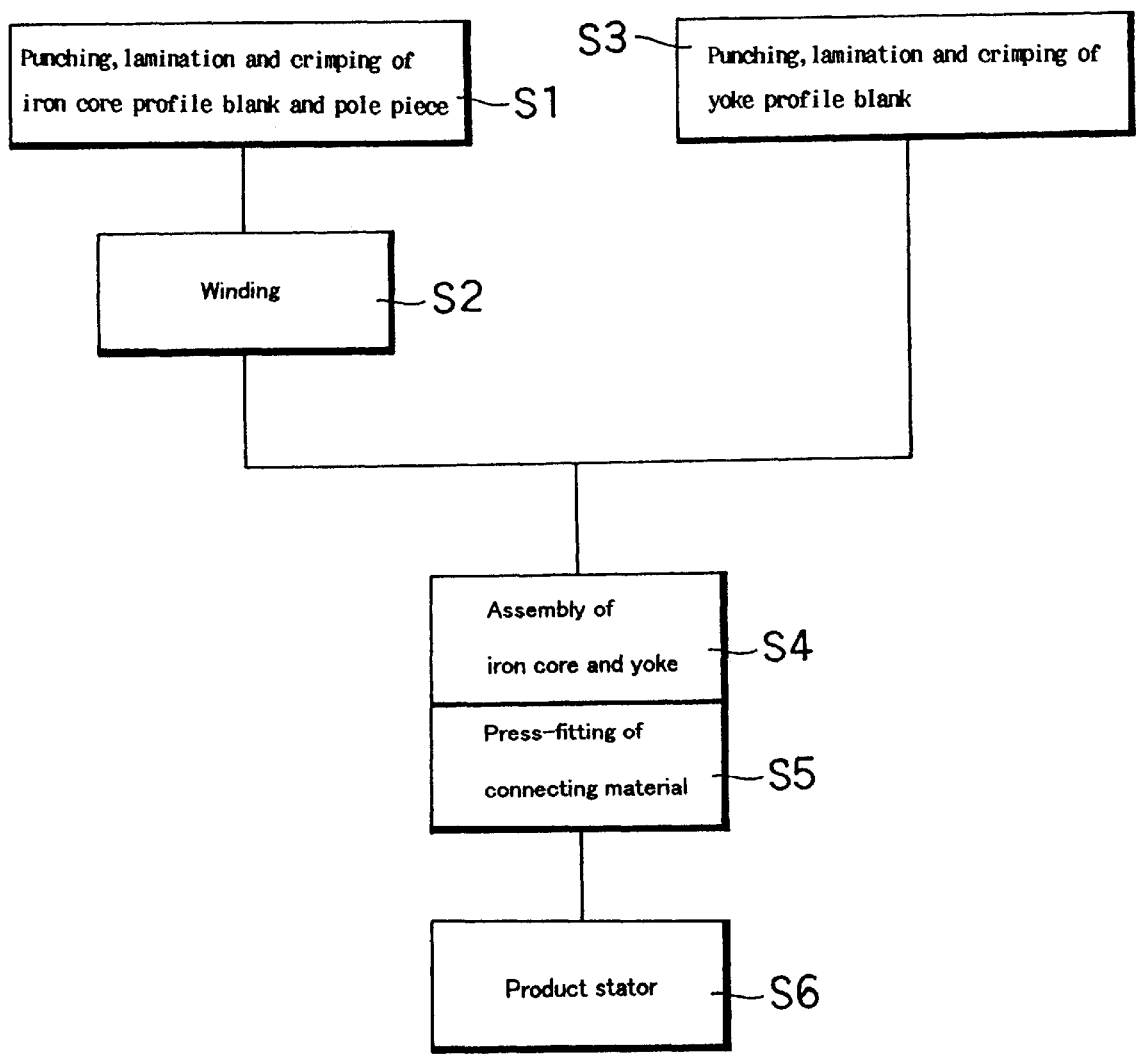
FIG. 1 is a chart showing a preferred embodiment of the present manufacturing process for a divided stator.

Referring now to the drawings, a preferred embodiment of the invention will be described in detail hereinafter. FIG. 1 through FIG. 9 show preferred embodiments of the present manufacturing process for a divided stator. In FIG. 9, the rotating electric apparatus 10 is made from a ring shaped stator 30 and a rotor 40 mounted inside an outer hull frame 20. The outer hull frame 20 is constructed with end pieces 22 fixed to the front and rear of the cylindrical housing 21 with screws. The rotor 40 is inserted in stator 30. A rotary shaft 41 of rotor 40 is rotatably connected to the end pieces 22 by bearings 11.

Figure 3:
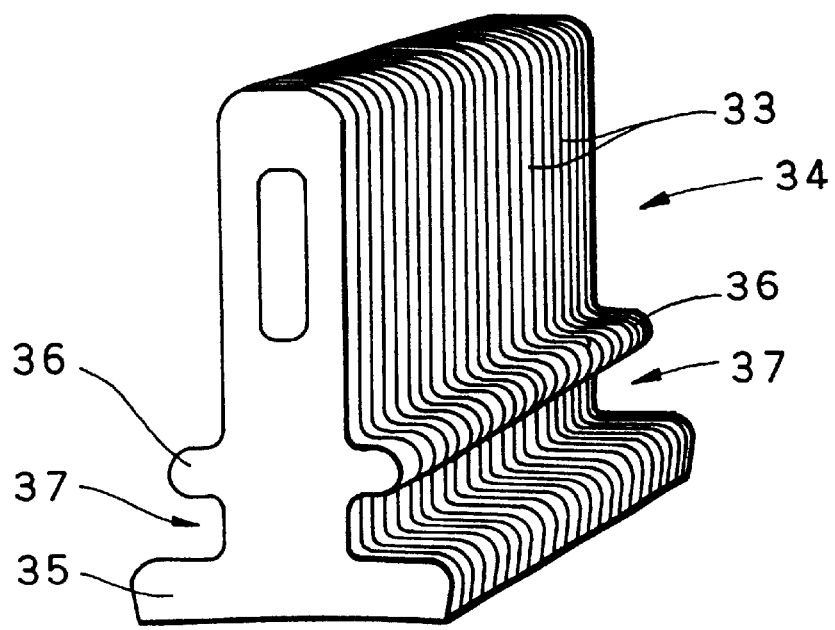
FIG. 3 is a perspective view showing the pole piece laminate used in the present manufacturing process.
Figure 4:
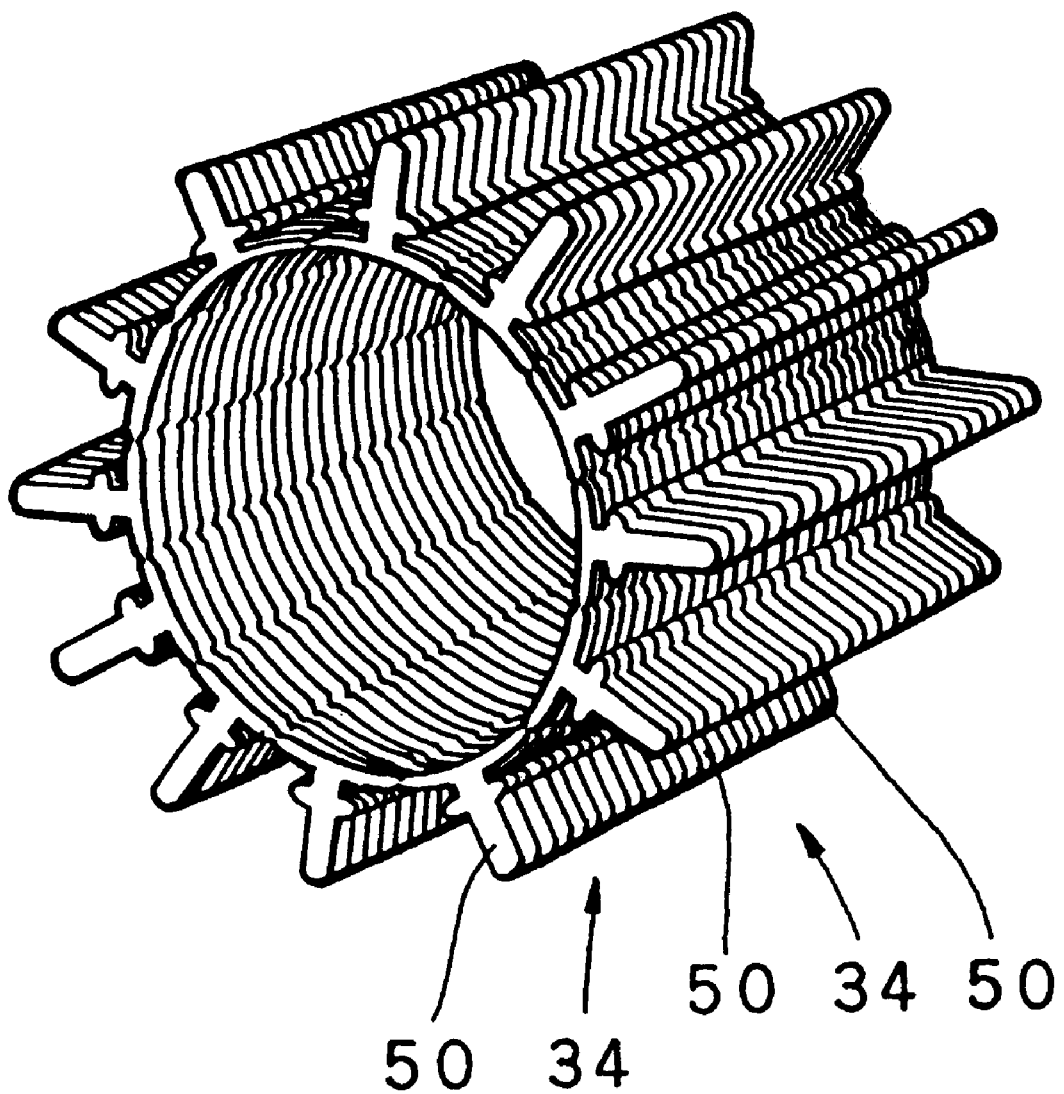
FIG. 4 is a perspective view showing the assembled iron core blank and pole piece laminates.
Figure 7:
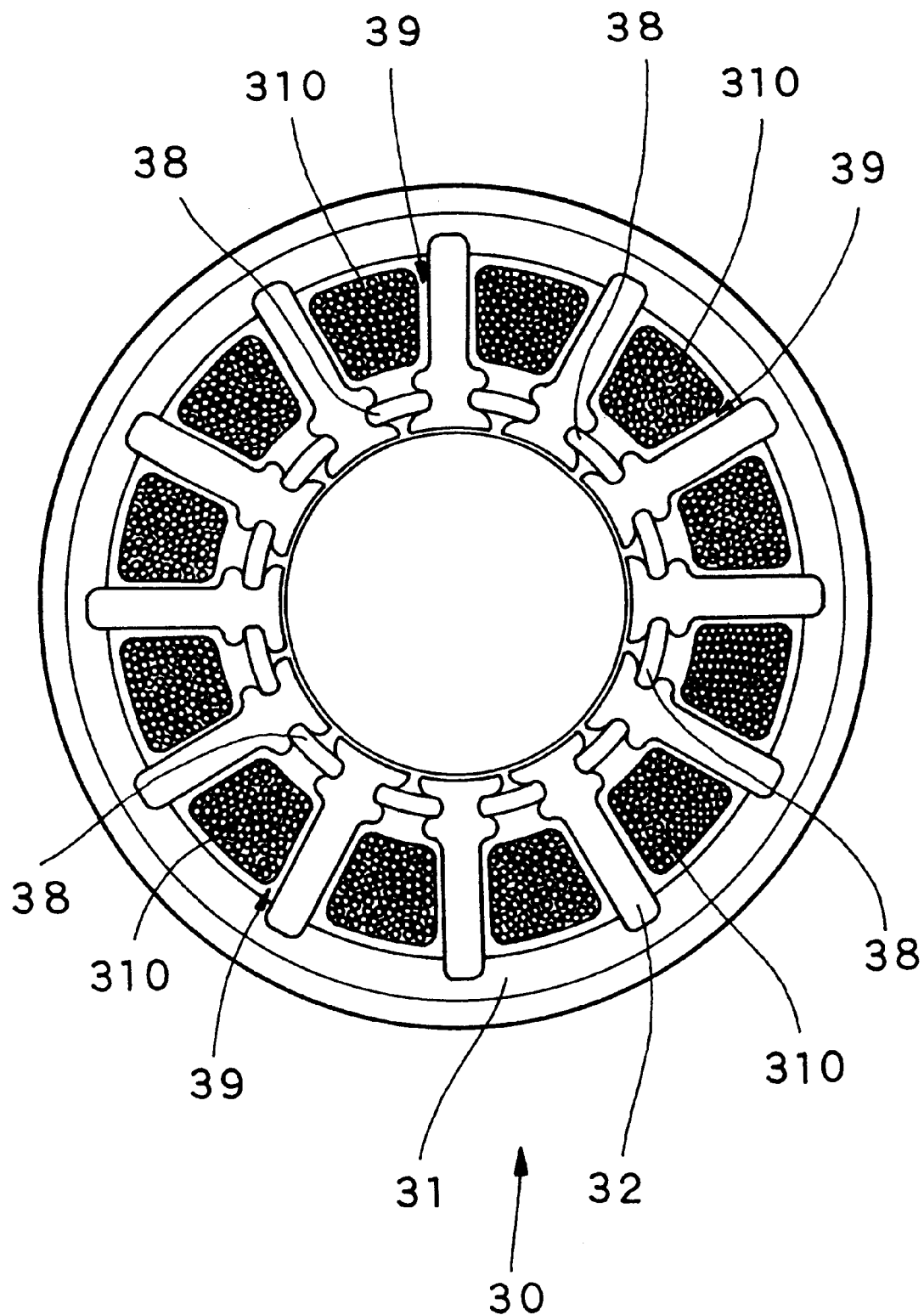
FIG. 7 is a front view of the divided stator manufactured by the present process.

As shown in FIG. 7, the stator 30 is made from an iron core 32 fitted into an outer ring yoke 31, and the iron core 32 has stator winding 310 wound around each slot 39. As shown in FIGS. 3 and 7, iron core 32 is formed by laminating a plurality of pole pieces 33, fixing these pieces to one another by crimping or welding, and arranging a plurality of the pole piece laminates 34 in the form of a ring. Each of the pole pieces 33 has a shape such that the front tip end 33a is in the form of an arc, and at the rear end portion, a pole portion 35 is formed protruded to both sides. In front of the pole portion 35, a protrusion 36 is formed with a fitting recess 37 in between pole portion 35 and protrusion 36, thus the pole piece 33 has a nearly ± shape.

As shown in FIG. 7, a plurality of pole piece laminates 34 are arranged in the form of a ring and are connected to one another by press-fitting connecting member 38 preferably made of a non-magnetic metallic material, for example, brass, into fitting recess 37. This connecting metal 38 has an arc shape, and the length of connecting metal 38 is generally equal to the thickness of the pole piece laminate 34.

Figure 6:
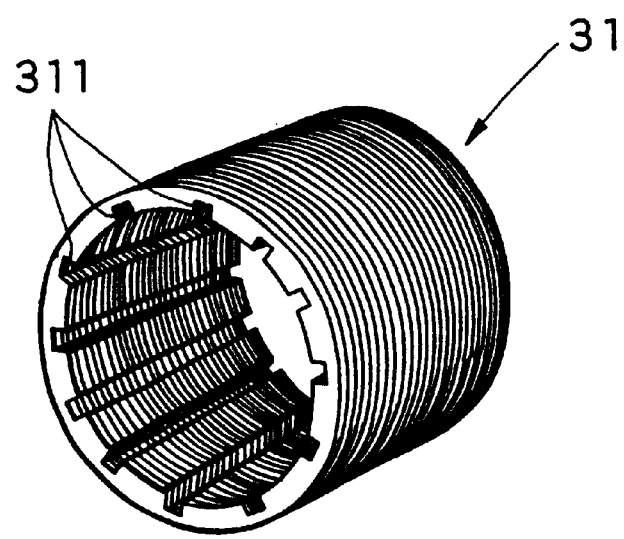
FIG. 6 is a perspective view showing the outer ring yoke in the present manufacturing process.

As shown in FIG. 6, fitting recesses 311 are formed on the inner circumferential edge of the outer ring yoke 31 in correspondence with each pole piece laminate 34. The outer tip portion of the pole piece laminate 34 is fit into each fitting recess 311, thereby preventing inward displacement of each pole piece laminate 34. Displacement is further prevented by fitting the connecting metal 38 between adjacent pole piece laminates 34.

Next, the manufacturing process will be described in further detail. When a rotating apparatus 10 shown in FIG. 9 is manufactured according to the steps in FIG. 1, a plurality of iron core blanks 50 and pole pieces 33 are punched from an electromagnetic steel strip as shown as step S1 of FIG. 1. This iron core blank 50, as shown in FIG. 2, has a plurality of pole piece portions 54 arranged in the shape of a ring and connected at a thin-wall bridge portion 55 which is narrower at the center between pole portions 51 of a plurality of adjacent pole piece portion 54. The pole piece portion 54 has the same shape as that of the pole piece 33, that is, a front tip end in the form of an arc having a nearly ± shape overall. The pole portion 51 protrudes to both sides at the rear tip, and a protrusion 52 protrudes in a circumferential direction above pole portion 51, thereby forming a fitting recess 53 in between pole portion 51 and protrusion 52.

Figure 8A:
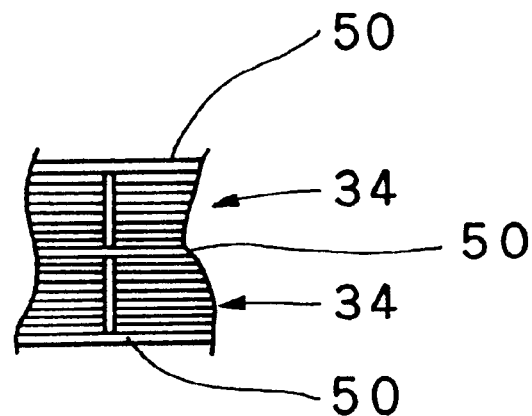
FIGS. 8(a) and 8(b) show steps in the manufacture of the iron core.
Figure 8B:
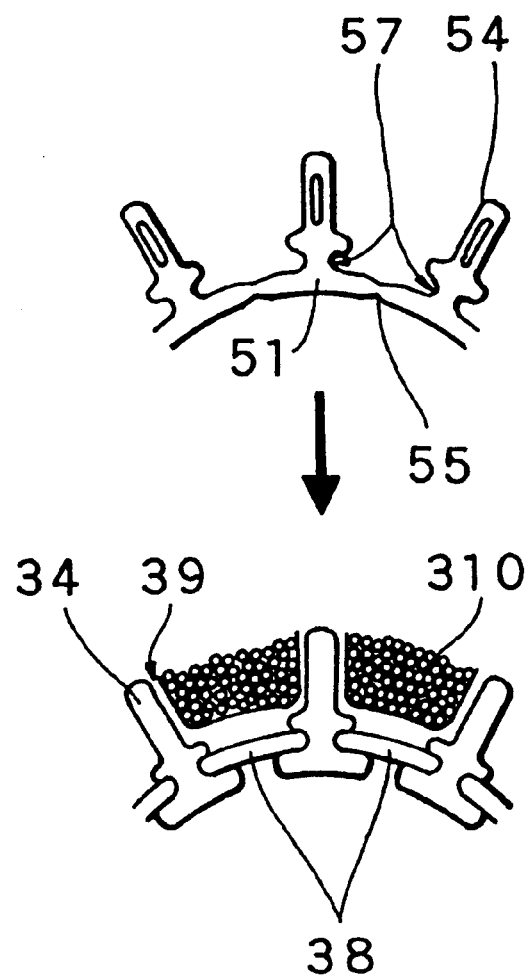

As shown in FIG. 8(a), according to the present process a plurality of pole pieces 33 are laminated with the iron core blank 50 present in the middle, and both sides of the pole piece laminate 34 are positioned between iron core blanks 50 and fixed to one another by crimping or welding. Then, as shown in FIG. 8(b), stator winding 310 is installed around the slot between the pole piece 54 of the iron core blank 50 and the pole piece laminate 34, and the winding is fixed with varnish as indicated at step S2 of FIG. 1. The winding may be fixed with varnish after assembling the inside and the outside cores.

Figure 2:
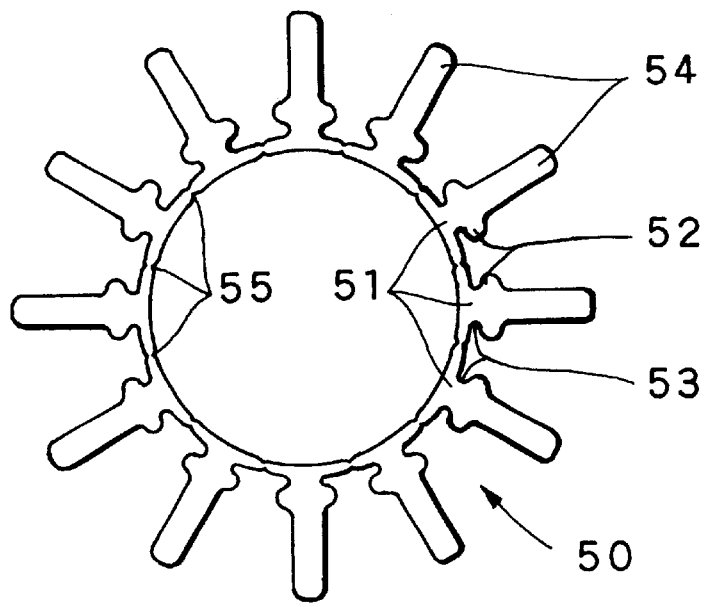
FIG. 2 shows the iron core blank in the above-mentioned manufacturing process.
Figure 5:
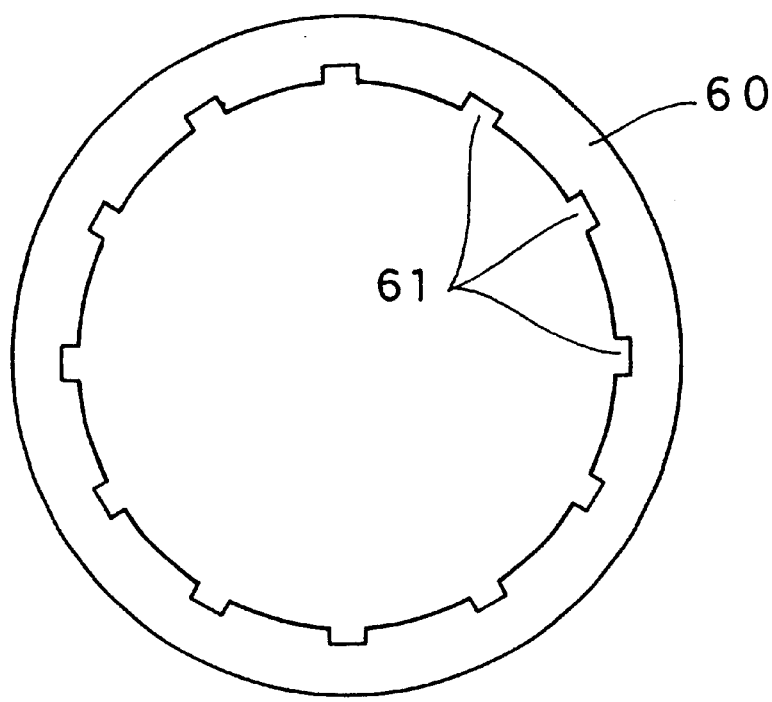
FIG. 5 shows the yoke blank in the above-mentioned manufacturing process.

With respect to the outer ring yoke 31, a plurality of yoke blanks 60 are punched from an electromagnetic steel strip as shown as step S3 of FIG. 1. This yoke blank 60, as shown in FIG. 5, is formed in the shape of a ring with individual fitting recesses 61 provided at specified intervals on the inner circumferential edge, into which the outer tip portion of each pole piece laminate 34 of the iron core 32 is fitted. The outer ring yoke 31 is manufactured by laminating a plurality of yoke blanks 60 and fixing them to each other by, for example, crimping as shown in FIG. 6. The plurality of individual recesses 61 of the yoke blank 60 collectively form recesses channels 311 of the outer ring yoke 30 when a plurality of yoke blanks 60 have been fixed together by lamination.

When the iron core 32 and the outer ring yoke 31 are manufactured, the iron core 32 is fitted into the outer ring yoke 31, and the connecting member 38 is pressure-fitted in the laminating direction between the fitting recesses 37, 53 of each of the adjacent pole piece laminates 34 and the iron core blanks 50. Then each pole piece laminate 34 and the pole piece 54 of the iron core blank 50 are positioned outwards in the radial direction with the inner end of the fitting recess 311 of the outer ring yoke 31, and adjacent pieces are separated by breaking the bridge portion 55 of the iron core blank 50. The pole piece portion 54 contains a part of the pole piece laminate 34. At the same time, adjacent pole piece laminates 34 are connected to one another to make the iron core 32, and the iron core 32 is fitted and fixed to the outer ring yoke 31. Thus, a divided stator 30 is manufactured as shown as steps S4 and S5 of FIG. 1.

As shown in FIG. 9, the ring shaped stator 30 is inserted into a cylindrical housing 21 made of the outer hull frame 20 and rotor 40 inserted into the stator 30. The rotary shaft 41 of the rotor 40 is rotatably positioned onto the outer hull frame 20, and a coil wiring end 42 is pulled out from an outlet hole 43 of the outer hull frame 20. Thus a rotating electric apparatus as shown in FIG. 9 can be manufactured.

Figure 10:
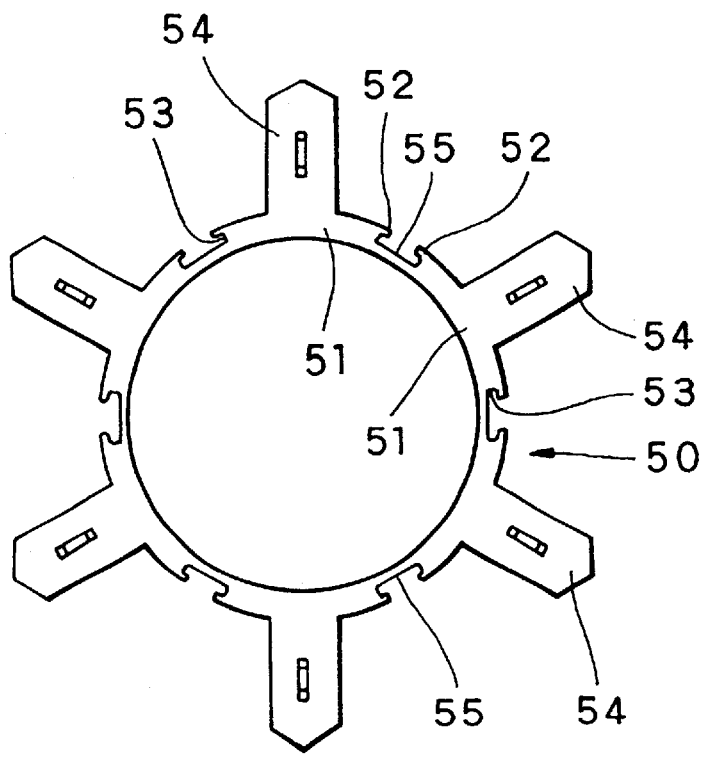
FIG. 10 shows the iron core blank in a particular embodiment.
Figure 11:
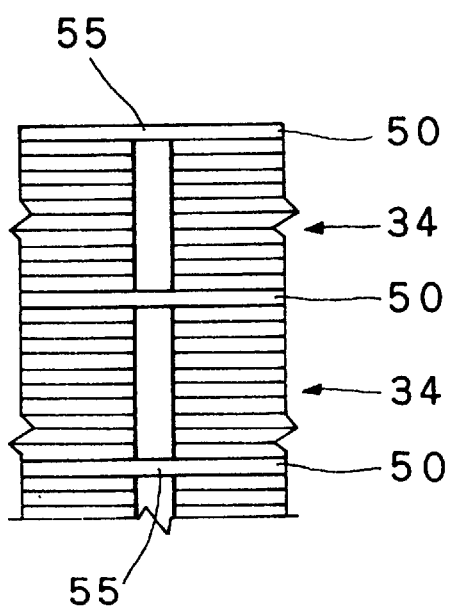
FIG. 11 shows the lamination of the iron core blank and pole piece.
Figure 12:
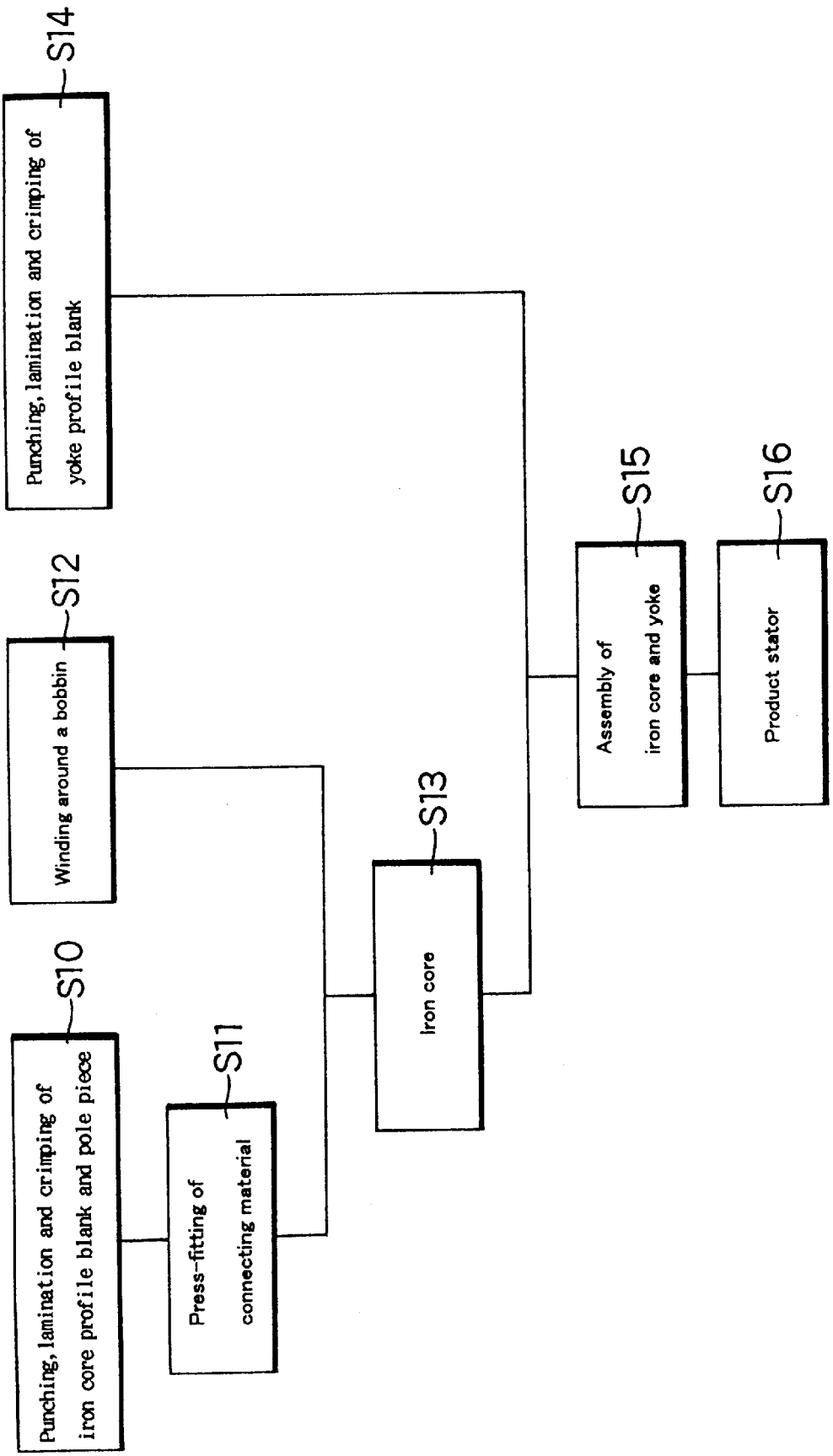
FIG. 12 is a chart showing a particular embodiment of the present process.

FIG. 10 through FIG. 12 show another embodiment, wherein like reference characters designate like or corresponding parts in FIG. 1 through FIG. 9. When a rotating electric apparatus 10 is manufactured by the process of this embodiment, a plurality of iron core blanks 50 and pole pieces 33 are punched from an electromagnetic steel strip. The iron core blank 50 has a structure similar to that of the first embodiment as shown in FIG. 10.

As shown in FIG. 11, when the iron core blank 50 and pole piece 33 are fabricated in this way, a plurality of pole pieces 33 are laminated with the iron core blank 50 located in the middle, and both sides of the pole piece laminate 34 are positioned between iron core blanks 50 and fixed to one another by crimping or welding as shown as step S10 of FIG. 12.

Then, a synthetic resin connecting member 38 is press fitted in the laminating direction between the fitting recesses 37, 53 of each of the adjacent pole piece laminates 34. Iron core blank 50 connects each of adjacent pole piece laminates 34 to pole piece portion 54 of the iron core blank 50 shown as step S11 of FIG. 12.

In another step, the coil is wound around a bobbin, and the winding is fixed with varnish shown as step S12 of FIG. 12. Then a jig is inserted and holds the inner circumference of the iron core blank 50 and the pole piece laminate 34 connected with the connecting member 38. Then, the bobbin with winding is inserted into the slot between the pole piece portion 54 of the iron core blank 50 and the pole piece laminate 34, and an iron core 32 is fabricated shown as step S13 of FIG. 12.

With respect to the outer ring yoke 31, a plurality of yoke blanks 60 are punched from an electromagnetic steel strip. Then a plurality of yoke profile blanks 60 are laminated and fixed to one another by crimping to fabricate the outer ring yoke 31 shown as step S14 of FIG. 12. After fitting and fixing the iron core 32 into the outer ring yoke 31, the jig is removed from the iron core 32 to form the divided stator 30 shown as process steps S15 and S16 of FIG. 12.

What is claimed is:

1. A manufacturing process for a divided stator comprising:

forming an iron core having outer circumferential slots; and winding coil around the outer circumferential slots of the iron core, and inserting the iron core into an outer ring yoke provided with a cylindrical inner surface;

wherein the iron core is formed by laminating a plurality of pole pieces having a fitting recess formed on both sides, fixing the plurality of pole pieces to each other to form pole piece laminates, arranging a plurality of the pole piece laminates in a ring, holding at least one of an outer circumference and an inner circumference thereof by jigs, and press-fitting connecting members along a laminating direction between adjacent fitting recesses in adjoining pole piece laminates.

2. A manufacturing process for a divided stator comprising:

forming an iron core having outer circumferential slots;

winding coil around the outer circumferential slots of the iron core, and inserting the iron core into an outer ring yoke provided with a cylindrical inner surface;

wherein the iron core is formed by forming an iron core blank comprising a plurality of pole pieces having a fitting recess formed on both sides of the pole pieces and arranging the pole pieces in a ring;

forming a bridge portion between the plurality of pole pieces adjacent to each other wherein the bridge portion can be broken by circumferential separation;

laminating and fixing a plurality of iron core blanks to form an iron core laminate, holding an outer circumference of the iron core laminate with a jig in such a manner that each pole piece advances outwards in a radial direction by a specified distance, breaking the bridge portion by separating the pole pieces in a circumferential direction while advancing each pole piece outwardly in a radial direction by press-fitting a connecting member between adjacent fitting recesses in adjacent pole pieces.

3. A manufacturing process for a divided stator comprising:

forming an iron core having outer circumferential slots;

winding coil around the outer circumferential slots of the iron core, and inserting the iron core into an outer ring yoke provided with a cylindrical inner surface;

wherein the iron core is formed by forming an iron core blank comprising a plurality of pole pieces, arranging the pole pieces in a ring, wherein a fitting recess is formed on both sides of the pole pieces;

forming a bridge portion between the plurality of pole pieces adjacent to each other, wherein the bridge portion can be broken by circumferential separation;

laminating a plurality of pole pieces to form pole piece laminates, arranging a plurality of pole piece laminates in a ring and positioning them between the pole pieces of at least two iron core blanks and fixing the pole pieces to each other, holding at least one of an outer circumference and an inner circumference of at least two iron core blanks and a plurality of the pole piece laminates with a jig in such a manner that each pole piece and pole piece laminate can advance outwardly in a radial direction by a specified distance, breaking the bridge portion by press-fitting a connecting member between fitting recesses in pole piece laminates adjacent to each other thereby advancing each pole piece and pole piece laminate outwardly in the radial direction and adjacent pole pieces are separated in the circumferential direction, and at the same time connecting the adjacent pole pieces and pole piece laminates.

4. A manufacturing process for a divided stator comprising:

forming an iron core having outer circumferential slots;

winding a coil around the outer circumferential slots of the iron core, and inserting the iron core into an outer ring yoke provided with a cylindrical inner surface;

forming a bridge portion between a plurality of pole piece portions adjacent to each other, laminating at least two of the plurality of pole piece portions to form pole piece laminates;

arranging a plurality of pole piece laminates in a ring, positioning and fixing the pole piece laminates between at least two iron core blanks;

press-fitting a connecting member between fitting recesses in the pole piece laminates adjacent to each other.

5. A manufacturing process for the divided stator as in claim 2, wherein the bridge portion is a thin-wall portion between adjacent pole pieces.

6. A manufacturing process for the divided stator as in claim 3, wherein the bridge portion is a thin-wall portion between adjacent pole pieces.

7. A manufacturing process for the divided stator as in claim 4, wherein the bridge portion is a thin-wall portion between adjacent pole pieces.

8. A manufacturing process for the divided stator as in claim 2, wherein a yoke blank is formed having a fitting recess on an inner circumferential edge that allows at least one of an outer tip portion of the pole piece laminate and an outer tip portion of the pole piece and the pole piece laminate to be separated by a specified distance;

and wherein a plurality of yoke blanks are laminated and fixed to one another to form an outer ring yoke, wherein the jig includes an outer ring yoke, and the steps of forming and inserting the iron core into the yoke are carried out simultaneously.

9. A manufacturing process for the divided stator as in claim 3, wherein a yoke blank is formed having a fitting recess on an inner circumferential edge that allows at least one of an outer tip portion of the pole piece profile portion laminate and an outer tip portion of the pole piece and the pole piece laminate to be separated by a specified distance;

and wherein a plurality of yoke blanks are laminated and fixed to one another to form an outer ring yoke, wherein the jig includes an outer ring yoke, and the steps of forming and inserting the iron core into the yoke are carried out simultaneously.

10. A manufacturing process for the divided stator as in claim 1, wherein the connecting member comprises a non-magnetic metal material.

11. A manufacturing process for the divided stator as in claim 2, wherein the connecting member comprises a non-magnetic metal material.

12. A manufacturing process for the divided stator as in claim 3, wherein the connecting member comprises a non-magnetic metal material.

13. A manufacturing process for the divided stator as in claim 4, wherein the connecting member comprises a non-magnetic metal material.

* * * * *